United States Patent [19]
Lomas

[11] Patent Number: 5,858,207
[45] Date of Patent: Jan. 12, 1999

[54] FCC PROCESS WITH COMBINED REGENERATOR STRIPPER AND CATALYST BLENDING

[75] Inventor: David A. Lomas, Barrington, Ill.

[73] Assignee: UOP LLC, Des Plaines, Ill.

[21] Appl. No.: 985,989

[22] Filed: Dec. 5, 1997

[51] Int. Cl.⁶ .......................... C10G 11/00; B01J 20/34
[52] U.S. Cl. ...................... 208/113; 502/38; 502/41; 502/45; 502/47
[58] Field of Search ............... 208/113; 502/38, 502/41, 45, 47

[56] References Cited

U.S. PATENT DOCUMENTS

| | | | |
|---|---|---|---|
| 2,451,619 | 10/1948 | Hengstebeck et al. | 196/52 |
| 3,679,576 | 7/1972 | McDonald | 208/74 |
| 3,821,103 | 6/1974 | Owen et al. | 208/72 |
| 3,888,762 | 6/1975 | Gerhold | 208/120 |
| 3,926,778 | 12/1975 | Owen et al. | 208/74 |
| 4,717,467 | 1/1988 | Haddad et al. | 208/113 |
| 4,789,458 | 12/1988 | Haddad et al. | 208/151 |
| 5,000,841 | 3/1991 | Owen | 208/113 |
| 5,128,292 | 7/1992 | Lomas | 502/41 |
| 5,141,625 | 8/1992 | Lomas | 208/113 |
| 5,346,613 | 9/1994 | Lomas et al. | 208/164 |
| 5,462,652 | 10/1995 | Wegerer | 208/167 |
| 5,565,177 | 10/1996 | Cetinkaya | 422/144 |

Primary Examiner—Walter D. Griffin
Assistant Examiner—Tam Nguyen
Attorney, Agent, or Firm—Thomas K. McBride; John G. Tolomei

[57] ABSTRACT

An FCC arrangement uses a regenerator stripper vessel for removing CO and light hydrocarbons upstream of the regeneration zone that can operate with backmix addition of regenerated catalyst directly from the regeneration zone. The regenerator stripping vessel can also serve as a blending vessel for an the transfer of spent and regenerated catalyst back to the reaction zone for increasing the catalyst to oil ratio of the process. This invention makes the recycle of spent catalyst in large proportions possible for an FCC operation that cracks a heavy feed by eliminating light combustibles such as CO and light hydrocarbons from the regeneration zone. Elimination of light gases permits spent catalyst to be recycled to the riser despite the high delta coke produced by the heavy feed. The arrangement also offers versatility to the operation of the reaction zone since the system can be used with or without the blending of spent catalyst and to the operation of the regenerator stripper vessel which can vent the off gases to the regenerator vessel or another location such as the reactor. The arrangement is particularly suited for revamps of older stacked FCC units to accommodate heavier feed processing and spent and regenerated catalyst blending.

11 Claims, 1 Drawing Sheet

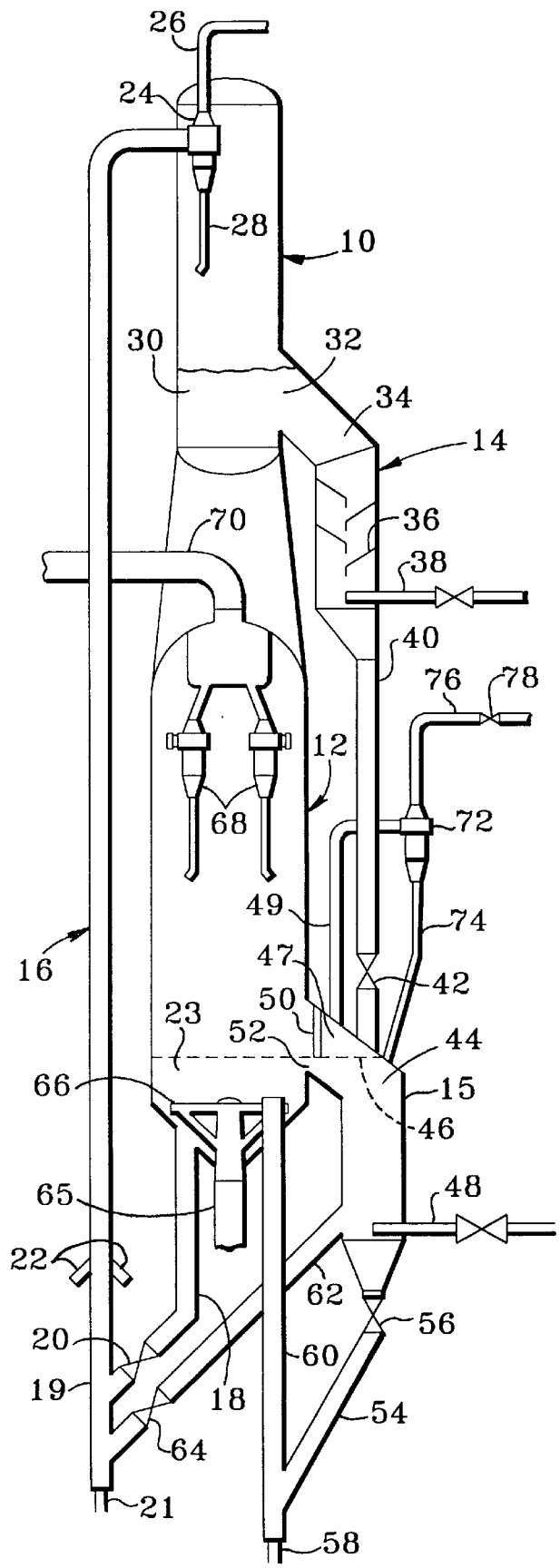

FCC PROCESS WITH COMBINED REGENERATOR STRIPPER AND CATALYST BLENDING

BACKGROUND OF THE INVENTION

1. Field of the Invention

This invention relates to the fluidized catalytic cracking (FCC) conversion of heavy hydrocarbons into lighter hydrocarbons with a fluidized stream of catalyst particles and regeneration of the catalyst particles to remove coke which acts to deactivate the catalyst. More specifically, this invention relates to feed and catalyst contacting and to catalyst circulation.

2. Description of the Prior Art

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. A high temperature regeneration within a regeneration zone operation burns coke from the catalyst. Coke-containing catalyst, referred to generally by those skilled in the art as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones, and combusting coke in the regenerator are well known by those skilled in the art of FCC processes. To this end, the art is replete with vessel configurations for contacting catalyst particles with feed and regeneration gas, respectively.

Despite the long existence of the FCC process, techniques are continually sought for improving product recovery both in terms of product quantity and composition, i.e. yield and selectivity and regeneration operation. Three facets of the FCC process that have received attention are recovery of adsorbed products from the spent FCC catalyst, stripping of gases from regenerated FCC catalyst and initial contacting of the FCC feed with the regenerated catalyst. Improvement in the recovery of hydrocarbons from spent catalyst directly improves yields. Better initial feed and catalyst contacting tends to benefit yield and selectivity. Removing gases from regenerated catalyst facilitates process operation.

Therefore, improved methods are sought for disbursing feed within the catalyst stream while avoiding localized overheating of the feed and achieving thermal equilibrium between the relatively hotter catalyst and the relatively cooler feed. Such methods would reduce the localized overheating of the feed or the severity of the feed heating caused by the large temperature differentials between the feed and the catalyst which both contribute to feed over cracking.

The processing of increasingly heavier feeds and the tendency of such feeds to elevate coke production makes the control of regenerator temperatures difficult. Optimization of feedstock conversion is ordinarily thought to require essentially complete removal of coke from the catalyst. This essentially-complete removal of coke from catalyst is often referred to as complete regeneration. Complete regeneration produces a catalyst having less than 0.1 and preferably less than 0.05 weight percent coke. In order to obtain complete regeneration, oxygen in excess of the stoichiometric amount necessary for the combustion of coke to carbon oxides is charged to the regenerator. Excess oxygen in the regeneration zone will also react with carbon monoxide produced by the combustion of coke, thereby yielding a further evolution of heat. Apart from the objective of minimizing dilute phase CO combustion, the increase in coke on spent catalyst results in a larger amount of coke being burned in the regenerator per pound of catalyst circulated.

Heat is removed from the regenerator in conventional FCC units in the flue gas, and principally in the hot regenerated catalyst stream. An increase in the level of coke on spent catalyst will increase the temperature difference between the reactor and the regenerator, and the regenerated catalyst temperature overall. A reduction in the amount of catalyst circulated is, therefore, necessary in order to maintain the same reactor temperature. However as discussed above, the lower catalyst circulation rate required by the higher temperature difference between the reactor and the regenerator will lower hydrocarbon conversion, making it necessary to operate with a higher reactor temperature in order to maintain conversion at the desired level. This will cause a change in yield structure which may or may not be desirable, depending on what products are required from the process. Also, there are limitations to the temperatures that can be tolerated by FCC catalyst without having a substantial detrimental effect on catalyst activity. Generally, with commonly available modem FCC catalyst, temperatures of regenerated catalyst are usually maintained below 760° C. (1400° F.), since loss of activity would be very severe at about 760°–790° C. (1400°–1450° F.). If a relatively common reduced crude such as that derived from Light Arabian crude oil was charged to a conventional FCC unit, and operated at a temperature required for high conversion to lighter products, i.e., similar to that for a gas oil charge, the regenerator temperature would operate in the range of 870°–980° C. (1600°–1800° F.). Restrictions on catalyst circulation can, therefore, have impact on the effectiveness of feed contacting by restricting the circulation of catalyst.

Restricting the catalyst circulated through the reactor side of the FCC process affects more than yield structure of the products. The circulation rate of catalyst to the reactor influences the catalyst circulation rate through the regenerator. A decrease in the circulation of catalyst to the reactor can also lower the overall catalyst circulation rate through the regenerator. The use of additional conduits such as a recirculation line that transfers catalyst from the outlet of the regeneration zone to the inlet of the regeneration zone can reduce the interdependency of catalyst circulation through the reactor and regeneration zone. However, the use of a recirculation conduit complicates regulation of the catalyst circulation through the process and necessitates the maintenance of additional catalyst inventory on the reactor and regenerator side of the process to provide a buffer for variations in catalyst circulation. Thus, the reactor and regenerator usually operate with two interdependent catalyst circulation loops.

There are a number of patents that de-couple the two interdependent loops by returning catalyst recovered from the reactor back to the reaction zone inlet. U.S. Pat. No. 3,679,576 represents one approach to such recirculation of catalyst where spent and regenerated pass together momentarily through a short section of relatively small diameter conduit before contacting the FCC feed. U.S. Pat. No. 3,888,762 shows a variation on such an arrangement where the feed, catalyst from the reactor and regenerated catalyst all come together simultaneously in a riser conduit. These arrangements offer greater flexibility in the circulation of catalyst through the FCC unit and the catalyst to feed ratio, but they do not address the problem of localized feed over cracking and feed heating severity.

Another group of patents U.S. Pat. No. 5,346,613, U.S. Pat. No. 5,462,652, and U.S. Pat. No. 5,565,177 use a mixture of spent and regenerated catalyst to contact feed in an FCC riser or in an arrangement for ultra short feed contacting. U.S. Pat. No. 5,346,613 that discloses a blending vessel for receiving spent and regenerated catalyst and supplying a mixture of spent and regenerated catalyst to a reaction zone and as recycle to the regeneration zone.

More complete stripping of hydrocarbons from the spent catalyst offers an additional means of recovering more useful products from the FCC unit. More complete stripping removes hydrocarbons from the catalyst that are lost by combustion when the spent catalyst enters the regeneration zone. Common methods to more completely strip catalyst raise the temperature of the spent catalyst in the stripping zone as a means of desorbing hydrocarbons from spent catalyst prior to regeneration. One system for heating spent catalyst in the stripping zone employs indirect heat transfer. A more common method of heating spent catalyst in the stripping zone mixes higher temperature regenerated catalyst with the spent catalyst in the stripping zone. U.S. Pat. Nos. 3,821,103 and 2,451,619 describe systems for direct heating of spent catalyst with hot regenerated catalyst.

In addition to increasing hydrocarbon recovery, reducing the carryover of hydrocarbons into the regeneration zone improves the overall heat balance of the FCC unit Hydrocarbons that enter the regeneration zone release additional high temperature heat as they burn in the oxygen atmosphere. Any additional heat release in the regenerator interferes with the regenerator operation by raising temperatures in the regeneration zone or requiring cooling methods to maintain a suitable temperature.

Further to the stripping of spent catalyst from the reactor, there are also advantageous to stripping the regenerated catalyst before it is sent back to the reactor. While hot catalyst stripping of catalyst entering the regenerator will keep potential products out of the regenerator, stripping of the catalyst leaving the regenerator could displace inert gases from void volume of the catalyst to prevent carryover of inert material from the regenerator to the reactor. Accordingly, it is desirable to perform hot catalyst stripping of regenerated catalyst as well as spent catalyst. However, stripping of regenerated catalyst has not been successfully practiced due to problems of catalyst deactivation. Contact of the high temperature regenerated catalyst with steam will thermally deactivate the catalyst and makes regenerated catalyst stripping impractical.

Therefore in summary, feed contacting and yields have been improved by increasing the catalyst to oil ratio in the initial contact of the hydrocarbons with the hot catalyst. In order to increase the catalyst to oil ratio without increasing the heat supply to the catalyst, systems for blending spent catalyst and regenerated catalyst have been proposed which increase the volume of catalyst while lowering the average catalyst temperature. The spent catalyst that is mixed with the regenerated catalyst has still been found to have sufficient activity to contribute substantially to the catalytic cracking of the hydrocarbons. Again, the heat balance problems associated with the processing of heavier feeds directly interfere with the blending of spent and regenerated catalyst by increasing the coke make and raising regenerator temperatures. Accordingly, more effective stripping of the spent catalyst will permit increased utilization of spent and regenerated catalyst and aid in an additional improvement to feed contacting and yields.

SUMMARY OF THE INVENTION

It is an object of this invention to provide spent and regenerated catalyst stripping.

It is a further object of this invention to facilitate the mixing of spent and regenerated catalyst for stripping and the blending of spent and regenerated catalyst for contacting an FCC feedstream in a reaction transport conduit.

It is a further object of this invention to provide flexibility in obtaining a heat balance in the processing of heavy FCC feedstreams that permits blending of spent and regenerated catalyst.

Another object of this invention is to provide a stripping zone that can provide stripping of spent of catalyst as well as regenerated catalyst.

This invention is an FCC process that has a regenerator stripper vessel for removing CO and light hydrocarbons upstream of the regeneration zone that can operate with A backmix or flow through addition of regenerated catalyst directly from the regeneration zone and that can also serve as a blending vessel for the transfer of spent and regenerated catalyst back to the reaction zone to increase catalyst circulation and moderate catalyst temperature. This invention makes an operation with the recycle of spent catalyst to the reaction conduit possible for a heavy feed by eliminating light combustibles such as CO and light hydrocarbons from the regeneration zone. Therefore, spent catalyst can be recycled to the riser despite the high delta coke produced by the heavy feed and the recycle of spent catalyst. The arrangement also offers versatility to the operation of the reaction zone since the system can be used with or without the blending of catalyst to the reaction zone. In addition, the regenerator stripper vessel can be operated to return, by level control, vented stripping gas from to the regenerator stripper vessel to the regenerator vessel or to another location such as the reactor or an external receiving location.

The subsequent stage of stripping provided by the regenerator stripping vessel can advantageously promote a low temperature regeneration operation with limited after burning of CO. Ready access to regenerated catalyst drives the regenerator stripping vessel to a relatively high temperature for a stripping operation. This additional stage of stripping at a relatively high temperature provides a stripped catalyst stream that has essentially all low molecular weight combustible material removed therefrom. Therefore, the amount of fuel entering the regeneration zone in the form of hydrogen and relatively light hydrocarbons is essentially eliminated so that the total heat value of the stripped catalyst entering the regeneration zone is in many cases at least 40 percent less than the heat value of catalyst that normally enters the regeneration zone from less complete stripping operations. With the lower heat value of the catalyst, a single-stage regeneration zone can provide regenerated catalyst having a nearly complete removal of coke at a temperature below 1350° F. The relatively low regenerator temperature prevents catalyst deactivation which in turn allows the use of additional stages of stripping on the catalyst that leaves the regeneration zone. Stripping of the catalyst that is withdrawn from the regeneration zone keeps noncondensable gases out of the reactor riser when the regenerated catalyst is transferred thereto. The non-condensable gases from the riser pass into the reactor side stripper and onto the separation facilities where the gases interfere with the operation of the wet gas compressor.

A particular advantage of this invention is the recovery of the light hydrocarbon stream from the secondary stripper of the regenerator vessel as a fuel. It is much more advantageous to the heat balance and economies of the process to be able to recover a useful fuel gas stream rather than passing CO from the regenerator for combustion and generation of steam. Accordingly, the invention provides a source of low pressure fuel for use in a heater or other utilities. The recovery of these otherwise unstripped hydrocarbons has significant process advantages since they could result in severe after-burn and uneven flue gas temperatures in the regenerator and particularly in the regenerator flue gas cyclones.

The hot stripping of the catalyst in the regenerator stripping vessel also has the additional advantage of improving the quality of the flue gas discharged from the regeneration vessel. For example the secondary stripping gas from the regenerator stripping vessel removes sulfur bearing compounds from the catalyst in the form of $H_2S$ before it enters the regenerator and is converted to sulfur oxides. The arrangement of this invention can also remove polluting nitrogen compounds before their oxidation in the regenerator.

Another important advantage offered by this invention is the recycling of catalyst that has passed through the FCC reaction zone to moderate the temperature of the regenerated catalyst. In this manner the invention uses circulation of catalyst that is generally referred to as carbonized and regenerated catalyst to reduce the severity and improve the dispersion of feed and catalyst contacting by combining spent and regenerated catalyst in a manner to more effectively control catalyst activity and temperature. The term "carbonized catalyst" refers to regenerated catalyst that has had at least some contact with the feed to deposit coke on the catalyst. Carbonized catalyst is usually referred to as "spent catalyst". However, spent catalyst is often thought of as originating from an FCC stripper accordingly the term "carbonized catalyst" has been used in this application since the source of the carbonized catalyst can include the regeneration zone as well as the stripping zone. In addition the carbonized catalyst retains activity and therefore the term "spent catalyst" while generally accepted, is misdescriptive and it is the intention of this invention to more fully utilize this remaining activity by returning what is herein termed "carbonized" catalyst back to the reaction zone without any regeneration or with only partial regeneration.

The presence of coke on the catalyst can also benefit the process by reducing undesirable catalytic cracking reactions. The undesirable bimolecular reactions occur at highly acidic sites on the catalyst that are present on the fully regenerated catalyst. These sites strongly attract the hydrocarbon and are rapidly deactivated by coke accumulation. As subsequent recirculation passes coked catalyst particles through multiple cycles of riser contact without full regeneration, these non-selective sites remain covered with catalyst so that only the more selective cracking sites remain active on the catalyst. The circulation of more selective sites can improve the yield of more desirable products.

This arrangement is particularly well suited for additions to certain existing FCC units. The particular arrangement is referred to as a stacked FCC unit. Many of these units were built and it would be highly advantageous to many refiners to have a simple way of modifying there unit to more effectively process heavy feeds. This arrangement provides a simple and effective modification for such units to better process heavier feeds.

In one embodiment this invention is a process for the fluidized catalytic cracking of a hydrocarbon-containing feedstream. The process contacts a catalyst stream comprising carbonized and optionally regenerated catalyst in a reaction conduit with the feedstream and transports a reaction mixture of the carbonized catalyst and any regenerated catalyst and the feedstream through the reaction conduit. The reaction conduit discharges the reaction mixture from the reaction conduit and separates the reaction mixture into a product stream and a first spent catalyst stream. A stripping medium strips at least a portion of the spent catalyst stream with a first gas comprising a stripping medium to provide a second spent catalyst stream. At least a portion of the second spent catalyst passes to a regenerator stripping vessel that contacts the second spent catalyst with a second gas stream in the regeneration stripping vessel. The regenerator stripping vessel has direct and uninterruptable inflow and outflow communication with a catalyst bed in a regeneration vessel and the communication occurs across a common opening between the two vessels. The process withdraws an off gas stream from the regenerator stripping vessel, passes at least a portion of the first spent catalyst stream or the second spent catalyst stream to the regeneration zone to remove coke from the catalyst, and withdraws carbonized catalyst from the regenerator stripping vessel or the regenerator vessel to supply the carbonized catalyst for contact with the feed.

In an apparatus embodiment, this invention comprises a reactor vessel, a primary stripping vessel, a regenerator stripping vessel, and a regenerator. A reaction conduit transports a mixture of spent and regenerated catalyst into contact with an FCC feedstream. The reaction conduit discharges the feedstream into a separator for recovery of a product stream and a spent catalyst stream. The primary stripper is in open communication with the stripping vessel and receives spent catalyst therefrom. A spent catalyst conduit transfers spent catalyst from the primary stripping vessel to the regenerator stripping vessel. A common opening defined by the regenerator stripping vessel and the regenerator vessel provides open communication therewith. Means are provided for passing a stripping gas into the regenerator stripping vessel and a chamber defined at least in part by the regenerator stripping vessel collects stripping gas and stripped gases from the top of the regenerator stripping vessel. Means are provided for transferring spent and regenerated catalyst to the bottom of the reaction transport conduit and a dense bed in the regeneration zone.

Additional objects, embodiments, and details of this invention will become apparent from the following detailed description.

ADDITIONAL PRIOR ART LISTING

U.S. Pat. No. 5,141,625 discloses a regeneration vessel that uses subadjacent vessel for catalyst stripping and transfers catalyst from the subadjacent vessel to the regeneration vessel.

U.S. Pat. No. 5,128,292 discloses a backmix catalyst cooler the uses a baffle near the top of its inlet to disengage gas from catalyst.

BRIEF DESCRIPTION OF THE DRAWINGS

The FIGURE is a schematic sectional elevation of an FCC unit arranged in accordance with this invention.

DETAILED DESCRIPTION OF THE INVENTION

This invention is more fully explained in the context of an FCC process. The FIGURE shows a typical schematic arrangement of a stacked FCC unit arranged in accordance with this invention. The description of this invention in the context of the specific process arrangement shown is not meant to limit it to the details disclosed therein. The FCC arrangement shown in the FIGURE depicts a modified stacked FCC unit that consists of a reactor 10, a regenerator 12, a primary stripping vessel 14, a regenerator stripping vessel 15, and an elongate riser reaction zone 16 that provides a conversion zone for the pneumatic conveyance of catalyst. The arrangement circulates catalyst and contacts feed in the manner hereinafter described.

Suitable catalysts for this invention include any of the well-known catalysts that are used in the art of fluidized catalytic cracking. These compositions include amorphous-clay type catalysts which have, for the most part, been replaced by high activity, crystalline alumina silica or zeolite-containing catalysts. Zeolite containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. ZSM-5 type catalysts are particularly preferred since the high coke selectivity of these catalyst will tend to preserve active sites as coke-containing catalyst makes multiple passes through the riser and thereby maintain overall activity.

In addition to catalyst, this invention may benefit from the circulation of inert particulate material. Recirculating solids on the reaction side of the process without regeneration will raise the level of coke on solids and can result in excessive regenerator temperature. Adding an inert material will decrease the average coke on solids ratio for material entering the regenerator without affecting the solids to oil ratio on the reactor side of the process. In this manner the inert material acts as a heat sink in the regeneration process. Suitable inert solids are any refractory material with low coke production properties such as alpha alumina, fused alumina and low surface area clays. Material and methods for recycling inert solids in an FCC processes are further described in U.S. Pat. No. 4,859,313, the contents of which are hereby incorporated by reference.

FCC feedstocks, suitable for processing by the method of this invention, include conventional FCC feeds and higher boiling or residual feeds. The most common of the conventional feeds is a vacuum gas oil which is typically a hydrocarbon material having a boiling a range of from 650°–1025° F. and which is prepared by vacuum fractionation of atmospheric residue. These fractions are generally low in coke precursors and the heavy metals which can deactivate the catalyst. Heavy or residual feeds, i.e., boiling above 930° F., which have a high metals content, are finding increased usage in FCC units. These residual feeds are characterized by a higher degree of coke deposition on the catalyst when cracked. Both the metals and coke serve to deactivate the catalyst by blocking active sites on the catalysts. Coke can be removed to a desired degree by regeneration and its deactivating effects overcome. Metals, however, accumulate on the catalyst and poison the catalyst by fusing within the catalyst and permanently blocking reaction sites. In addition, the metals promote undesirable cracking thereby interfering with the reaction process. Thus, the presence of metals usually influences the regenerator operation, catalyst selectivity, catalyst activity, and the fresh catalyst makeup required to maintain constant activity. The contaminant metals include nickel, iron, and vanadium. In general, these metals affect selectivity in the direction of less gasoline and more coke. Due to these deleterious effects, the use of metal management procedures within or before the reaction zone are anticipated in processing heavy feeds by this invention.

An essential part of this invention is the addition of a regenerator stripping vessel in close proximity to a regenerator vessel. The regeneration vessel operates with a dense bed in its lower portion for communication with the regenerator stripping vessel. The regenerator stripping vessel is located close enough so that a large common opening between the vessels will communicate with a catalyst bed maintained in the bottom of the catalyst regenerator. The opening between the two vessels should have minimum flow path length to provide ready catalyst migration between the two locations. For the purposes of this invention the common opening can include a short conduit connection between the vessels and means an opening having at least one transverse dimension that is greater than the horizontal distance between the outsides of the regenerator vessel and the stripper vessel. The transverse dimension of the common opening refers to the size of the free flowing area and therefore such measurement would not extend any baffle that is located over the opening. Its short length permits the common opening to provide unrestricted inflow and outflow between the regenerator vessel and the regenerator stripping vessel. The close location of the regenerator stripping vessel with respect to the dense catalyst bed of the regenerator permits the stripping vessel to operate and, in its simplest arrangement to provide effective hot catalyst stripping in a backmix mode. In this manner, the regenerator stripping vessel can operate as a hot stripping zone.

In its simplest form, the regenerator stripping vessel can receive spent catalyst from a primary catalyst stripper and provide a secondary stripping function for the catalyst passed therein. In this type of operation, it may operate in a simple backmix mode. It will usually be advantageous to keep the stripping vapor from the regenerator stripping vessel isolated from the regeneration vessel. This is most readily accomplished by forming a disengaging chamber at the top of the regenerator stripping vessel. The bottom of the disengaging chamber provides a catalyst interface that normally corresponds with the top of a dense bed level in the regenerator vessel. An outlet located near the top of the chamber will withdraw an off gas stream containing primarily stripping gas and stripped light materials such as CO and dry gases. Heat balance is most effectively controlled by venting this stream from the process to fuel or other uses. A separator can remove entrained catalyst from the secondary stripping gas as it leaves the regenerator stripping so that the gas is in a condition for addition to a fuel system.

Where heat balance considerations have an inconsequential effect on the operation of the process. The vent gas stream from the regenerated catalyst stripper may vented directly into the regeneration vessel for removal from the process. In this case, the regenerator stripping vessel can mainly serve the function of a blending zone for mixing spent and regenerated catalyst for supply to a reaction conduit, although it will serve to displace regenerator gases from the regenerated catalyst as it passes to the reaction zone.

Suitable stripping gases for the regenerator stripping zone will comprise steam. The addition of spent catalyst to the regenerator stripping zone moderates the temperature of the zone. Because of the addition of spent catalyst to the regenerator stripping gas, the supply of steam to the zone will not cause substantial catalyst deactivation.

Looking then at the FIGURE a regenerator conduit 18 passes regenerated catalyst from a dense bed 23 in the bottom of regenerator vessel 12 into a lower section 19 of elongated riser conduit 16 at a rate regulated by a control valve 20. A lift gas stream that enters section 19 of the riser conduit via an inlet nozzle 21 transports the stream of catalyst up riser section 19 and in contact with an FCC feedstream injected into the riser through nozzles 22. Riser conduit 16 discharges the mixture of catalyst and hydrocarbons into a cyclone separator 24 located in reactor vessel 10. Cyclone separator 24 produces a product stream taken overhead from the reactor vessel via a line 26. Products from the reactor are typically transferred to a separation zone for the removal of light gases and heavy hydrocarbons from the products. Product vapors enter a main column (not shown) that contains a series of trays for separating heavy components such as slurry oil and heavy cycle oil from the product vapor stream. Lower molecular weight hydrocarbons are recovered from upper zones of the main column and transferred to additional separation facilities- or gas concentration facilities.

Cyclone 24 discharges spent catalyst from a dip pipe conduit 28 into the bottom of reactor vessel 10. Reactor vessel 10 usually maintains a dense catalyst bed 30 in a lower section which communicates catalyst through an opening 32 into an upper section 34 of primary stripping vessel 14. Primary stripping vessel 14 can contain sloped baffles 36 or other appropriate contacting means to increase the efficiency of stripping in the vessel via a stripping fluid. Stripping fluid enters the bottom of stripper 14 through a line 38. Typically stripping gas in its usual form of steam is added to the primary stripping vessel 14 in an amount equaling 0.5 to 2 wt % of the feed charged to the riser. Stripper 14 typically operates at about the same temperature as that of the catalyst and product leaving the riser. At these temperatures, contact of the catalyst with the stripping fluid will remove readily strippable hydrocarbons from the catalyst surface. As gas and vapors continue to rise in the stripper countercurrently to the flow of catalyst, the concentration of hydrocarbons in the stripping fluid increases. Additional hydrocarbon vapors recovered in primary stripper 14 flow upwardly out of upper stripper section 34 and are recovered via appropriate venting not shown into cyclone separator 24 or other separation means. Spent catalyst flows downwardly from primary stripper 14 through a spent catalyst conduit 40 at a rate regulated via a control valve 42.

Conduit 40 discharges catalyst into an upper portion of regenerator stripping vessel 15. The by-products of the coke combustion that consist primarily of CO and $CO_2$ are separated from the entrained catalyst that is transferred from dense bed 23 into regenerator stripping vessel 15. Regenerator stripping vessel 15 maintains a dense bed of catalyst 44 at a level 46 that coincides with the level of the dense bed 23 in the bottom of regeneration vessel 12. The secondary fluidizing gas enters regenerator stripping 15 via a line 48. A baffle 50 extends downwardly across a large, common opening 52 between the regenerator vessel and the regenerator stripping vessel. Below baffle 50, catalyst from the regeneration vessel and the regenerator stripping vessel have open communication. The amount of stripping gas or other fluid injected into the bottom of the regenerator stripping vessel will affect the amount of catalyst interchange between dense bed 23 and 44. Additional circulation of catalyst between dense bed 44 and dense bed 23 may be provided by a direct flow of catalyst through the chamber. A lift conduit 54 may withdraw catalyst from the bottom of regenerator stripping vessel 15 at a rate regulated by a control valve 56. A lift gas stream 58 lifts stripped catalyst into bed 23 via conduit 60. A suitable distributor (not shown) may be added to the top of conduit 60 to evenly disperse catalyst across the top of bed 23. Spent catalyst or a blend of spent and regenerated catalyst from regenerator stripping vessel 15 can be transferred directly to the bottom section 19 of the reactor riser via a conduit 62 at a rate regulated by valve 64.

Cycling of catalyst between the dense beds of the regeneration zone and the regenerator stripping vessel can be accomplished by direct transfer, backmixing, or a combination of the two. Backmix transfer is the simplest from an equipment viewpoint and relies on the degree of fluidization and turbulence to raise or lower the amount of catalyst interchange across the common opening 52. Where backmixing provides the only interchange of catalyst between the regenerator vessel and the regenerator stripping vessel, catalyst for return to the riser is usually withdrawn directly from the regeneration vessel for return to the riser. Catalyst circulation may be more directly controlled by direct removal of catalyst from the bottom of the regenerator stripping vessel and transported back into the regeneration vessel in a flow through manner. The flow through transport of moving catalyst through the regenerator provides increased control of the regenerated to carbonized ratio such that a suitable blend of catalyst may be withdrawn directly from the regenerator stripping vessel for return to riser.

The addition of lift lines 54 and 60 to the regeneration stripping vessel and regenerator vessel greatly enhances the versatility of the regenerator stripping operation. The removal of catalyst from the bottom of the cooler through regenerator stripping vessel 15 at a rate controlled by valve 56 provides the opportunity for complete temperature control within vessel 15. As more lift is performed through conduit 60 for circulating catalyst through regenerator bed 23 and dense bed 44, the temperature through vessel 15 can be increased. A high circulation rate through conduits 54 and 60 will cause the average operating temperature of bed 44 to approach that of bed 23. This high temperature stripping can eliminate almost all light combustibles from the regeneration zone and is again particularly advantageous for making this process suitable for operating with residual feeds. Where blending of spent catalyst and secondary stripping is not desired regenerator stripping vessel 15 may be operated with minimal addition of a fluidization gas into the bottom of vessel 15 via line 48. In this manner there is an essentially simple transfer of a spent catalyst to and recirculation of regenerated catalyst around the bottom of the stripping vessel with fully regenerated catalyst supplied by conduit 18.

As previously mentioned mixing of the hot catalyst, spent catalyst, and stripping fluid in vessel 15 provides what is known as a "hot stripping section." Stripping chamber 44 is operated to maintain a dense bed of catalyst. The combination of the first stripping zone 14 provided below the reactor 10 and the second regenerator stripping vessel 15 has the advantage of providing a first stripping section that removes less highly adsorbed hydrocarbon components from the catalyst surface before they are overcracked and while they still have substantial product value. Passing catalyst from the first stripping zone to the second stripping zone allows further hydrocarbons, hydrogen, and strippable coke compounds to be removed from the catalyst surface. By this arrangement, the secondary hot stripping removes combustible material that, if left on the catalyst, would interfere with the regeneration process by increasing the amount of combustible material that enters the regeneration zone and the heat released during the regeneration process. "Hot catalyst stripping" refers generally to the operation of a catalyst stripper at a temperature above the usual reactor temperature. The regenerator stripping zone of this invention is preferably designed to maximize the removal of combustible material from the entering spent catalyst. Conditions within the stripping zone will typically include a temperature of from 975°–1200° F. Higher temperatures are preferred to maximize the removal of strippable compounds. Contact time within the stripping zone will vary from several seconds to about 2 minutes. A relatively long stripping time is preferred in order to maximize the removal of strippable compounds. Average residence times of less than 30 seconds in the second stripping zone may be used when the heat value of the spent catalyst entering the stripping zone is not high. Although longer average residence times than 2 minutes may be used, it is not believed that such longer duration will offer substantial advantages or improvements. The high temperature stripping operation leaves mainly graphitic coke on the catalyst surface. Hydrogen in the coke can be reduced to 4 or 5 wt % with the use of a hot stripping zone. Therefore, after the hot stripping, much of the coke is graphitic in form.

From a blending standpoint, maintaining dense phase conditions in the regenerator stripping vessel 15 greatly increases heat transfer between the catalyst particles. The dense phase conditions are characterized by a dense catalyst bed which is defined as having a density of at least 10 lbs/ft$^3$, and more typically, as having a density of from 20 to 50 lbs/ft$^3$. In order to maintain turbulent conditions within the blending vessel, one or more streams of fluidizing medium enter the vessel. At least a portion of the gas stream will comprise a suitable stripping medium for removal of light gases. Other portions of the fluidizing gas may comprise inert diluent material. In the typical arrangement shown by the FIGURE, most of the fluidization material entering via nozzle 48 will pass with primary products out of the regenerator stripping vessel through outlet 49. Therefore, the composition of the fluidizing gas will not ordinarily affect other parts of the process. A low temperature operation of the regeneration zone allows steam to be added to the regeneration stripping vessel as fluidization and stripping gas without causing substantial catalyst deactivation. Any steam deactivation that might occur can be minimized by operating the dense bed 44 at a relatively low temperature at least below 1250° F. Fluidization gas passes through the blending zone at a typical superficial velocity of from 0.2 to 3 ft/sec. In more typical stripping and blending situations stripping gas or fluidizing gas flows through a regenerator stripping vessel 15 at a superficial gas velocity in a range of about 1 ft/sec. A turbulent regime can be established in dense bed 44 to increase the interchange of catalyst across common opening 52.

The gas stream, removed from the secondary zone, consists primarily of fluidization or stripping fluid, highly cracked hydrocarbons, and hydrogen. The non-condensible gases that are also removed from the regenerated catalyst by the use of stripping vessel 15 can consist primarily of CO, $CO_2$, sulfur, nitrogen, and oxygen that are present in the regeneration zone. Because of the higher temperatures and longer duration of catalyst contact, the gas removed from a hot stripping zone has a very low molecular weight and is highly suitable for use as a fuel or for lift gas in the riser. Typically, the gaseous mixture withdrawn from the second stripping zone will contain, on a water-free basis, between 30–70% light paraffinic hydrocarbons and lighter gases.

The stripping vessel 15 may optionally have a lower baffle 53 located in front of baffle 50 over inlet 52 that provides an additional hopper 57. Baffle 53 also preferably extends above baffle 52. Spacing baffle 53 in front of baffle 50 and extending baffle 53 above baffle 52 defines a channel 55 through which provides a draw-off of catalyst from hopper 57. The presence of baffle 53 improves the quality of the gas stream that can be withdrawn from chamber 47 by impeding the carry-over of oxygen and nitrogen from the regeneration zone. This has the dual effect of preventing hydrocarbon conversion in stripper 15 from the presence of oxygen and the lowering of the BTU value of the recovered gas by dilution with nitrogen.

Stripping gases may be collected in chamber 47. Gases are typically withdrawn from chamber 47 through a line 49 at an average gas velocity of about 50 ft/sec. The gas velocity and the amount of catalyst withdrawn through line 49 is preferably controlled by regulating the outlet pressure. Conduit 49 will usually deliver the stripper off gas stream to a cyclone 72 for a removal of entrained catalyst. Products can be recovered overhead from cyclone 72 via a line 76 that has a valve 78 for regulating flow through the cyclone on pressure or level control. The amount of gas withdrawn by conduit 49 can be kept at a sufficiently low rate to approximately equal the amount of gas displaced from the catalyst entering through conduit 40 to thereby minimize the additional withdrawal of the secondary stripping gas with the stripped components recovered via line 76.

Cyclone 72 is shown in communication with stripping vent gas line 49 and is optional for the process. The use of cyclones 72 is unnecessary when most of the gases from line 49 are returned to a location where fine catalyst particles will not pose any problems in its operation. Where a substantial amount of the gaseous mixture from conduit 49 is passed directly for fuel use, cyclone 72 is used to take the catalyst from the feedstream. Cyclone 72 is used to remove fine catalyst particles from the exiting gaseous mixture which are returned to the stripping zone by dip leg conduit 74. Cyclone 72 may be located externally as shown in the FIGURE or chamber 47 may be enlarged and extended upward (not shown) to house cyclone 72 internally and to eliminate the need for conduit 49. When located externally, catalyst from Cyclone 74 may be returned to any convenient location including dense bed 44 as shown in the FIGURE, the regenerator vessel or riser 16.

The venting of the off gases from the regenerator stripping may also be varied by controlling the level 46 of beds 44 and 23. Dropping the level of 46 below baffle 50 allows stripping gas to flow out into the dilute phase of the regenerator vessel or into the chamber 47.

The preferred operation of this invention where carbonized and regenerated catalyst are blended will typically increases the relative amount of catalyst that contacts the feed. The amount of blended catalyst that contacts the feed will vary depending on the temperature of the regenerated catalyst and the ratio of carbonized to regenerated catalyst comprising the catalyst blend. Generally, the ratio of blended catalyst to feed will be in a broad range of from 1 to 50. The term "blended catalyst" refers to the total amount of solids that contact the feed and includes both the regenerated catalyst from the regenerator and the carbonized catalyst from the reactor side of the process. Preferably, the blended catalyst to feed will be in a ratio of from 5 to 10 and more preferably in ratio of from 10 to 15. This higher ratio of catalyst to feed promotes rapid vaporization of the feed and increases the catalyst surface area in contact with the feed to make vaporization more uniform. The greater quantity of catalyst reduces the added heat per pound of catalyst for raising the temperature of the entering feed so that a high feed temperature is achieved with less temperature differential between the feed but with the same amount of heat and more contact area.

The regenerated catalyst will have a substantially higher temperature than the blended catalyst. Regenerated catalyst from the regenerator 18 will usually have a temperature in a range from 1100° to 1400° F. and, more typically, in a range of from 1200° to 1400° F. Once the blended catalyst mixture contacts the feed, the blended catalyst mixture accumulates additional coke on the catalyst particles and has a lower temperature than the blended mixture upon its return to the reactor riser and reactor. The temperature of the carbonized catalyst will usually be in a range of from 900° to 1150° F., but its temperature will vary depending on source. The relative proportions and temperatures of the catalyst from the regenerator or regenerator stripping vessel will determine the temperature of the blended catalyst mixture that enters the riser. The blended catalyst mixture will usually range from about 1000° to 1400° F. and, more preferably is in a range of from 1050° to 1250° F. Supplying the heat of reaction for the cracking of the hydrocarbon feed requires a substantial amount of regenerated catalyst to initially contact the feed. Therefore, the temperature of the blended catalyst mixture will usually be substantially above the temperature of the catalyst that enters the regenerator stripping vessel from the primary stripper. Ordinarily the ratio of catalyst from the primary stripper to regenerated catalyst entering the regenerator stripping vessel will be in a broad range of from 0.1 to 5, and more typically, will be in a range of from 0.5 to 1.0. The ratio of carbonized to regenerated catalyst will be difficult to determine quantitatively in some operating circumstances of this invention since the spent and regenerated catalyst will typically mix freely across opening 52 and since the mixture may consist of a blend withdrawn directly from either bed 23 or bed 44. The amount of coke on the carbonized catalyst passed between the reaction zone, regeneration zone and regenerator stripping vessel will vary depending on the total residence time of specific catalyst particles within the process loop that passes catalyst from the regenerator stripping vessel back to the riser or the dense bed 23 of the regenerator vessel. Since the cycling of catalyst particles between the regenerator and the regenerator stripping vessel is random, some catalyst particles may experience many cycles through the riser before entering the regeneration zone. Thus some particles may contain a heavy coke concentration in comparison to particles that have only passed once through the reaction zone since regeneration. Nevertheless, the spent catalyst entering the regeneration zone as well as the catalyst cycling through the process will typically have an average coke concentration of between 0.7 to 1.25 wt %. Carbonized catalyst for the purpose of this invention can comprise catalyst transferred from the regenerator vessel, regenerator stripper, or elsewhere and is general defined as having a coke concentration of more than 0.2 wt %. Preferably, sufficient coke-containing catalyst will be recycled such that the mixture of catalyst in the reaction zone contains at least 20 wt % carbonized catalyst, and more typically, will contain 50 wt % carbonized catalyst.

On the regeneration side of the process, spent catalyst transferred to dense bed 23 via opening 52 undergoes the typical combustion of coke from the surface of the catalyst particles by contact with an oxygen-containing gas. The oxygen-containing gas enters dense bed 23 via an inlet 65 and is distributed across the bottom of the bed by a distributor 66. The fluidization conditions establish upward superficial gas velocity of between 1 to 4 ft/sec and a bed in a density range of from 25 to 50 lbs/ft$^3$. Residence time through the bed will usually provide sufficient reaction time to completely combust coke and fully regenerate the catalyst i.e. removal of coke to less than 0.2 wt % and preferably less than 0.1 wt %. Combustion of coke from the catalyst particles raises the temperatures of the catalyst to those previously described for catalyst withdrawn by regenerator standpipe 18. Flue gas consisting primarily of CO or $CO_2$ and including any gases vented through opening 52 and conduit 60 pass upward and enters a separator, such as the cyclones 68 to remove entrained catalyst particles from the rising, flue gas before the flue gas exits the vessel through an outlet 70.

Cyclone separators are not a necessary part of this invention. This invention can use any arrangement of separators to remove spent catalyst from the product stream. In particular a swirl arm arrangement, provided at the end of riser 16 can further enhance initial catalyst and cracked hydrocarbon separation by imparting a tangential velocity to the exiting catalyst and converted feed mixture. Such swirl arm arrangements are more fully described in U.S. Pat. No. 4,397,738 the contents of which are hereby incorporated by reference. Product vapors comprising cracked hydrocarbons and trace amounts of catalyst exit the top of reactor vessel 10 through conduits 26. Catalyst separated by cyclone 24 returns to the reactor vessel through dip leg conduit 28 into a dense bed 30.

The reactor and regenerator arrangement shown in the FIGURE may also benefit from external heat removal. Such external heat recovery systems include well known arrangements such as catalyst coolers and remove heat by indirect heat exchange. In order to control temperatures when processing relatively heavy FCC feedstocks or when lower temperatures are desired, catalyst coolers may be added in communication with dense bed 23, dense bed 44 or by extending regenerator stripping vessel 15 to include a lower indirect heat exchange zone. Any number or type of catalyst coolers may be used to control or adjust the temperature of the regenerated catalyst or catalyst blend. The design of backmix coolers and other types of catalyst coolers are well known in the prior art.

What is claimed is:

1. A process for the fluidized catalytic cracking of a hydrocarbon-containing feedstream, said process comprising:

a) contacting a catalyst stream comprising carbonized and optionally regenerated catalyst in a reaction conduit with said feedstream and transporting a reaction mixture of said carbonized and any regenerated catalyst and said feedstream through said reaction conduit;

b) discharging said reaction mixture from said reaction conduit and separating said reaction mixture into a product stream and a first spent catalyst stream;

c) stripping at least a portion of said spent catalyst stream with a first gas comprising a stripping medium to provide a second spent catalyst stream;

d) passing at least a portion of said second spent catalyst to a regenerator stripping vessel and contacting said second spent catalyst with a second gas stream in said regeneration stripping vessel, wherein said regenerator stripping vessel has direct and uninterruptable inflow and outflow communication with a catalyst bed in a regeneration vessel and said communication occurs across a common opening;

e) withdrawing an off gas stream from said regenerator stripping vessel;

f) passing at least a portion of said first spent catalyst stream or said second spent catalyst stream to said regeneration vessel to remove coke from said catalyst, and g) withdrawing carbonized catalyst from said regenerator stripping vessel or said regenerator vessel to supply said carbonized catalyst for contact with said feed.

2. The process of claim 1 wherein a chamber located in said regenerator stripping vessel above the common opening collects said off gas stream and said off gas stream is withdrawn from above said common opening.

3. The process of claim 1 wherein said carbonized catalyst is withdrawn directly from the catalyst bed in said regeneration vessel.

4. The process of claim 1 wherein carbonized catalyst is withdrawn from the bottom of said regenerator stripping vessel and transported into said bed of said regeneration vessel.

5. The process of claim 1 wherein carbonized catalyst is withdrawn from said regenerator stripping vessel and transferred directly to said reaction conduit for mixing with catalyst from the bed of said regeneration vessel and production of a mixed stream for contact with said feedstream.

6. The process of claim 1 wherein said off gas stream is passed through said opening into said regeneration vessel.

7. The process of claim 1 wherein said off gas stream is passed to a reactor vessel.

8. The process of claim 1 wherein said regenerator stripping vessel operates under backmix conditions with no net flow of catalyst through the regenerator stripping vessel.

9. A process for the fluidized catalyst cracking of a hydrocarbon-containing feedstream, said process comprising:

a) contacting a catalyst stream comprising carbonized catalyst at the bottom of a reactor riser with said feedstream stream and transporting a reaction mixture of spent catalyst, regenerated catalyst, and the feedstream upwardly through said reaction conduit;

b) discharging the reaction mixture from the riser and separating the reaction mixture into a product stream and a first spent catalyst stream;

c) passing the first spent catalyst stream to a first stripping zone and contacting said spent catalyst with a first stripping gas to provide a second spent catalyst stream;

d) passing at least a portion of the second spent catalyst stream to a regenerator stripping vessel and contacting the second spent catalyst stream with a second stripping gas in the regenerator stripping vessel, wherein said regenerator stripping vessel has direct and uninterruptable inflow and outflow communication with a catalyst bed in a regeneration vessel across a common opening;

e) collecting offgas from said regenerator stripping vessel in a chamber located in the top of said regenerator stripping vessel above the common opening and withdrawing the offgas from the regenerator stripping vessel;

f) passing at least a portion of the spent catalyst from said regenerator stripping vessel into a dense bed of said regeneration vessel; and g) passing at least a portion of spent stripped catalyst from the regenerator or the regeneration vessel to the bottom of the reactor riser portion of the regenerated catalyst from said dense bed to provide said catalyst stream comprising carbonized catalyst.

10. The process of claim 9 wherein a reactor vessel is located superadjacent to the regeneration vessel.

11. The process of claim 9 wherein stripped spent catalyst passes directly from said regenerator stripping vessel to the reactor riser; regenerated catalyst passes directly from the dense bed of the regeneration vessel to the bottom of the reactor riser, and a fluidizing gas stream contacts and mixes the spent and regenerated catalyst before contact with the feedstream.

\* \* \* \* \*